United States Patent
Wu

(10) Patent No.: US 7,821,710 B2
(45) Date of Patent: Oct. 26, 2010

(54) PROJECTOR SCREEN STRUCTURE

(75) Inventor: Ming-Lai Wu, Hsin-Tien (TW)

(73) Assignee: Ta Lai Sporting Goods Enterprise Co., Ltd., Taipei (TW)

(*) Notice: Subject to any disclaimer, the term of this patent is extended or adjusted under 35 U.S.C. 154(b) by 191 days.

(21) Appl. No.: 12/149,268

(22) Filed: Apr. 29, 2008

(65) Prior Publication Data

US 2009/0268286 A1    Oct. 29, 2009

(51) Int. Cl.
*G03B 21/56* (2006.01)
*D03D 15/00* (2006.01)

(52) U.S. Cl. .................................. 359/443; 442/189
(58) Field of Classification Search .............. 359/443, 359/461, 449, 459
See application file for complete search history.

(56) References Cited

U.S. PATENT DOCUMENTS

| | | | | |
|---|---|---|---|---|
| 1,743,602 A * | 1/1930 | Harson | .................. | 359/445 |
| 3,019,515 A * | 2/1962 | Otto et al. | .................. | 428/630 |
| 3,692,384 A * | 9/1972 | Kimura et al. | .................. | 359/445 |
| 4,006,965 A * | 2/1977 | Takada et al. | .................. | 359/443 |
| 4,107,363 A * | 8/1978 | Dawn et al. | .................. | 428/109 |
| 2008/0239243 A1* | 10/2008 | Hasegawa et al. | .................. | 353/30 |

FOREIGN PATENT DOCUMENTS

JP    3143023 U  *  7/2008

* cited by examiner

*Primary Examiner*—Christopher Mahoney
(74) *Attorney, Agent, or Firm*—Rabin & Berdo, PC

(57) ABSTRACT

The invention provides an improved projector screen structure. The improved screen structure is constituted by twist yarns from superfine single yarns and superfine nickel (Ni) chromium (Cr) alloy fiber. Through up-and-down weaving method for plain woven texture, all yarns are arranged in an organized and uniform fashion with tight spacing, so the fine screen constituted by such structure is suitable for any projectors that have different screen requirements and may be used to both front and back projection. The screen produced in this way can also deliver wide view angle, increased color saturation and contrast as well as better layer and three-dimensional effect. Moreover, the screen has zero radiation, low reflection, uniform light absorbance, flatness, antibacterial property, dustproof effect, water cleanability and durability, which are excellent attributes that traditional screens do not have. The present screen further improves comfort level for audiences and meets environmental requirements after disposal.

3 Claims, 4 Drawing Sheets

PROJECTOR SCREEN STRUCTURE

BACKGROUND OF THE INVENTION

1. Field of the Invention

The invention relates to a structure design for projector screen. Especially it refers to a projector screen structure that is suitable for various types of projectors which have different project screen requirements.

2. Description of the Prior Art

The pursuit for home theater effect has driven the projector screen from the early simple white wall type for single-function projector to advance projector screen for multi-function projector. The latter type of projector screen is usually divided into woven or elastic screen based on the material used. Generally, woven screens have rough texture which reduces image clarity and generates Moire pattern when projected on. The elastic screens are generally made from plastics and PVC and the screen surface is pressed to produce irregular pattern to allow better diffusing of light, as well as increasing view angle and picture uniformity. Since the projectors are developed to be multi-functional, the screens can be further divided into reflective type and transmitive type. The reflective type is used for front projection, while the transmitive type is used for rear projection.

In practice, a user would select a suitable projector and project screen that best fit his/her viewing objective. For example, if the objective is for small number of audience in a confined space, a metallic screen with small viewing angle and high light concentration may be selected; and whereas, for a large number of audience in a more opened space, a plastic screen with wide viewing angle and low light concentration may be selected.

Every type of screen has its own advantages and disadvantages and may not be suitable for all projectors. For example, although the white plastic screen has wide viewing angle, it's relatively dimmer and has low light reflective characteristic which would blur projected image and reduce picture quality. In a glass bead screen the surface is treated with an optical coating layer to increase image brightness and reflection, however, reflection may become too bright that is glaring to the eyes. Besides, the coating layer may not have good uniformity, which results in uneven reflection. Other problem concerning the conventional projector screen is that the chemical spray use in the manufacturing process can cause air pollution and secondary environmental issues when is disposed. Other screens may have disadvantages in limitation to single-side use, radiation effect, lacking water cleanability, uneven light absorbance and reflection, more weight for the same size screen. All these indicate there is a need of further improvement for the traditional screens.

The inventor actively sought solutions to benefit the general users by analyzing the drawbacks for all projectors screens, experimenting, making improvements, and finally developed a new type of screen with improved structure that is suitable for any type of projectors.

SUMMARY OF THE INVENTION

The primary objective for the invention is to provide an improved projector screen. Through an up-and-down weaving method for plain woven, all yarns are arranged in an organized and uniform fashion with tight spacing, so the fine screen constituted by such structure is suitable for any projectors that have different requirements for the screen quality. The screen produced in this way also deliver high quality projection effect and increase its' values.

Another objective for the invention is to provide an improved structure for projector screens to achieve wide view angle, color saturation, above standard contrast, and gains in layer and three-dimensional effect.

Yet, another objective for the invention is to provide an improved structure for projector screens to achieve zero radiation, low reflection, even light absorbance, flatness, antibacterial, dustproof, water cleanability and durability. These advantages will significantly distinguish the new screen from the traditional screens.

And finally, the invention is to provide an improved structure for projector screens for which the screens are produced by a weaving process without the use of chemicals and do not cause environmental issues after disposal.

To achieve the above objectives, the screen in the invention adopts twist yarns from superfine single yarns and superfine alloy fibers of nickel (Ni) chromium (Cr). Their ends per inch is between 22,000 and 30,000 counts (1.28 D)/inch while the picks per inch is between 14,000 and 20,000 counts (1.28 D)/inch. Then, an up-and-down weaving method is used to produce the screen that has very fine structure with very small and even yarn spacing. The metallic property of the superfine nickel (Ni) chromium (Cr) alloy fiber allows the screen to maintain its flatness. The high density weaving method also produces very tight yarn spacing that promotes uniform light absorbance and reflection and eliminates shadow and glares. The superfine nickel (Ni) chromium (Cr) alloy fiber also retains the antibacterial property and dustproof effect, as well as simple storage and prolonged life. The screen is suitable for water cleaning. When it is used for projection allows better color saturation and contrast which enable the picture to show distinctive layers and three-dimensional effect.

Moreover, the screen is woven with twist yarns from superfine nickel (Ni) chromium (Cr) alloy fiber and superfine single yarns, it does not contain any chemical additives, so after disposal, the fiber portion decays naturally and the metallic portion will return to the nature without causing environmental damage.

For the patent examiners to further understand the invention for an improved structure for projector screens with respect to its objectives and benefits, following is a detail description of the structural features of the invention.

DETAILED DESCRIPTION OF THE PREFERRED EMBODIMENT

Figure 1:
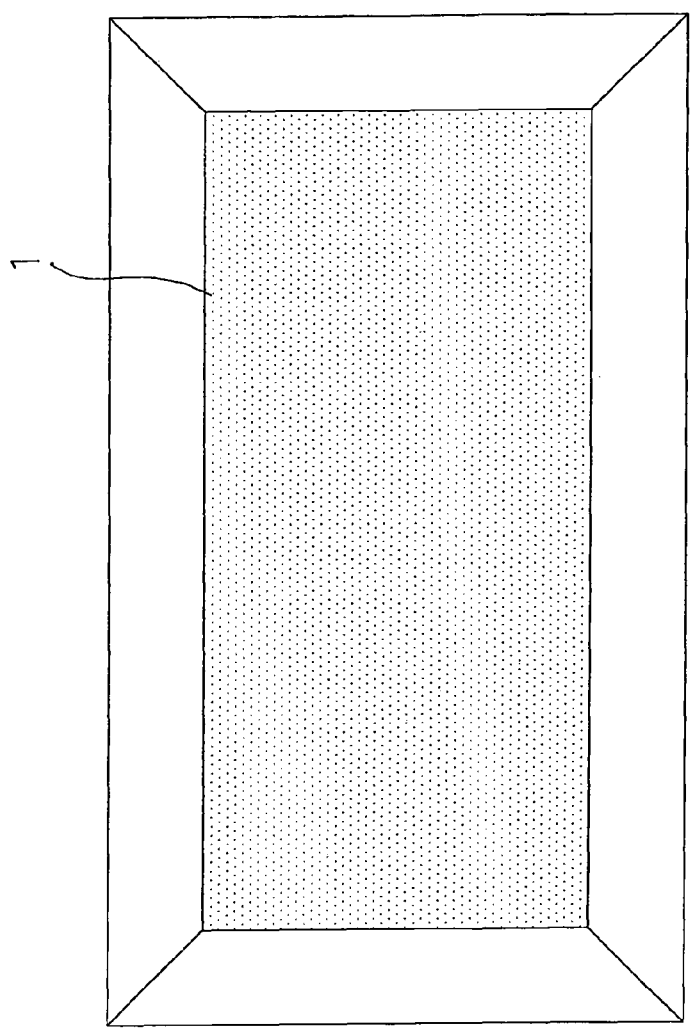
FIG. 1 is the exterior diagram for a preferred projector screen for the invention.

The invention provides an improved structure for projector screens. Refer to FIG. 1 for the exterior diagram for the disclosed screen. The ratio of width to height can be freely adjusted, or follow the traditional 4:3 design.

Figure 2:
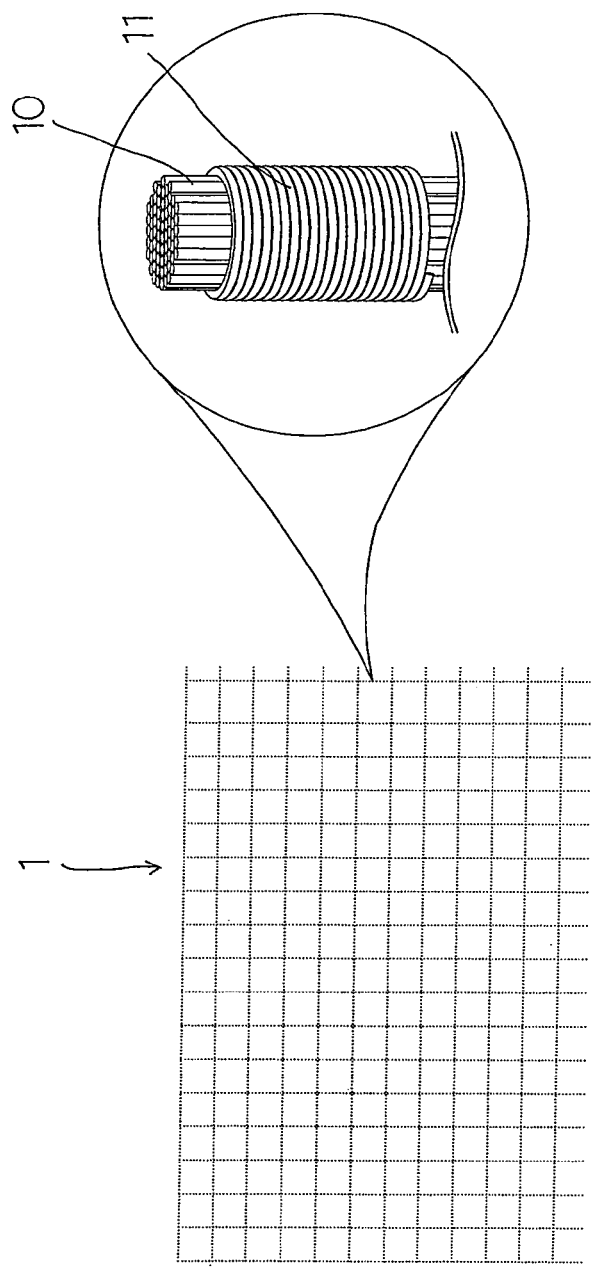
FIG. 2 is a partially enlarged diagram for a preferred projector screen for the invention.

For the constitution of the screen (1) structure, refer to FIG. 2. screen (1) is made of twist yarns from superfine single yarns (11) and superfine nickel (Ni) chromium (Cr) alloy fiber (11) by an up-and-down weaving method. Thus, the screen (1) has very fine surface and small and uniform yarn spacing. An electromechanical apparatus is used to open and fix the screen for a testing equipment to assure uniform tension on the screen and flatness but no waviness.

In an actual manufacturing process, the superfine single yarns are 1.28 denier/ply and 1,300,000 counts in total. The superfine nickel (Ni) chromium (Cr) alloy fiber (0.028 mm) is a twist yarn from an advanced process technology. An up-and-down weaving method for plain texture is adopted with ends per inch between 22,000~30,000 counts (1.28 D)/inch and picks per inch between 14,000~20,000 counts (1.28 D)/inch. For this example, ends per inch 22,656 counts (1.28 D)/inch and picks per inch 14,784 counts (1.28 D)/inch (optimal value after experimentation) are used for weaving. All the yarns are arranged in a uniform and organized fashion with equal and small spacing. Both sides of the screen are made the same for use. The screen is subject to an electromechanical screen opening and fixation before screen tension measurement, which assures even screen tension with below 0.5 Newton error, and tightness, flatness and no waviness.

The above-mentioned superfine nickel (Ni) chromium (Cr) alloy fiber (11) can also combine with suitable natural (staple) fibers, such as wools and rabbit hairs, in a way to produce covered yarn structure that the natural fibers are wrapped around by the superfine nickel (Ni) chromium (Cr) alloy fiber and the yarn diameter is between 0.035~0.08 mm, preferably 0.038 mm. In the process to treat the superfine nickel (Ni) chromium (Cr) alloy fiber, a yarn feeding equipment is used to cover the natural fibers with nickel (Ni) chromium (Cr) alloy fiber in a way to achieve appropriate warping density. With the prerequisite of no broken fiber, the preferable process will have a 1 cm natural fiber wrapped around with 3~64 rounds of superfine nickel (Ni) chromium (Cr) alloy fiber. This will assure uniform flatness and excellent touch-feel on surface where there is a covering layer of natural fibers like wools or rabbit hairs.

The nature of the superfine nickel (Ni) chromium (Cr) alloy fiber allows the projection screen to sustain long-term flatness under actual application conditions. The high density weaving method also allow for uniform light absorbance and reflection due to fine and even spacing between yarns, as well as eliminating shadow and glares. Furthermore, the nature of the superfine nickel (Ni) chromium (Cr) alloy fiber provides antibacterial property and dustproof effect in addition to simple storage, durability and water cleanability. Therefore, when such a screen is in use, it increases color saturation and contrast to above the standard. Particularly, it provides dramatic layer and three-dimensional effect for the screen pictures.

Figure 3:
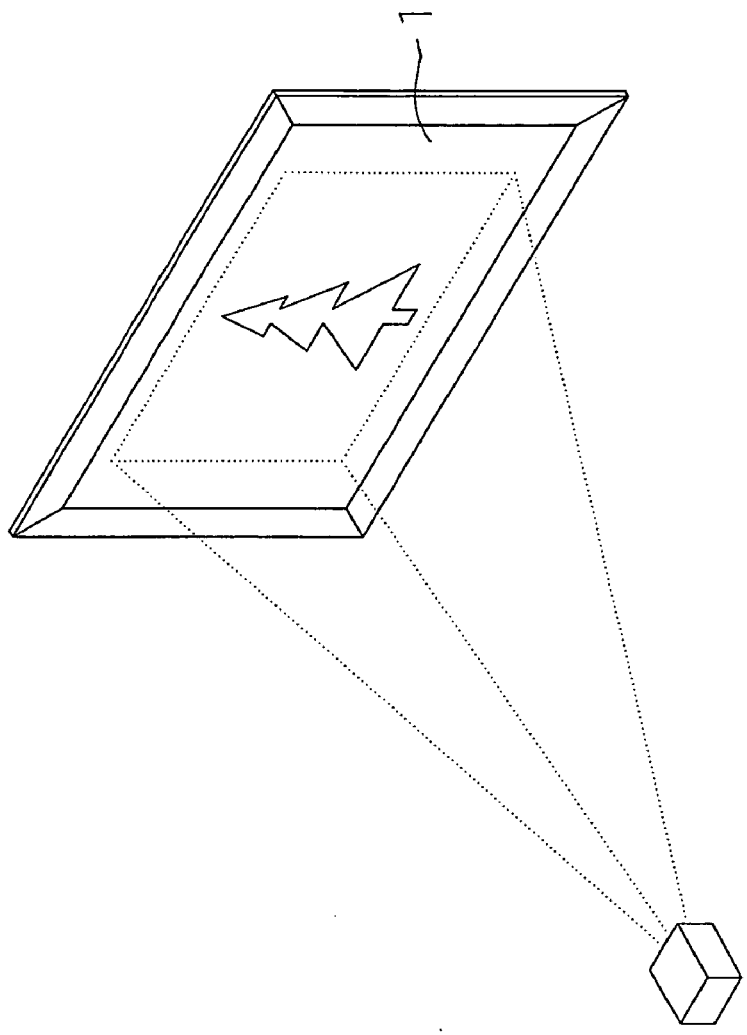
FIG. 3 is the status diagram for a preferred projector screen for the invention in use for front projection.
Figure 4:
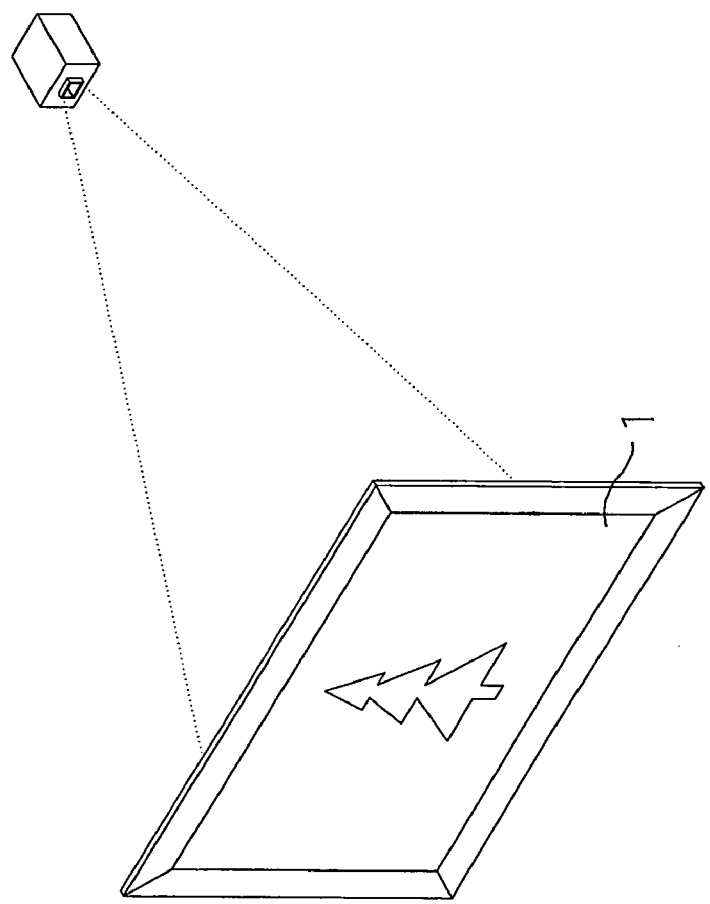
FIG. 4 is the status diagram for a preferred projector screen for the invention in use for rear projection.

Refer to FIG. 3 and FIG. 4 when the screen (1) in the invention is in use, the user can select either side. For front projection, vivid and fine pictures can be shown. If the ambient light is too strong, a black cloth can be put on the back of the screen. For rear projection, the picture is directly projected on the screen (1) from the back and shows up on the front side without any lighting equipment. It will not be affected by projector location and light source. This actually solves the drawback for the traditional screen that only one side could be used.

Additionally, since the screen is made of the twist yarns comprised of superfine nickel (Ni) chromium (Cr) alloy fiber and superfine single yarns, it does not contain any chemicals, so after disposal, the fiber portion will decay naturally and the metallic portion will return to the nature without causing environmental issues.

The features for the projector screen structure in the invention are emphasized below again.

The screen is made from special materials and weaving method, so it does not have waviness and covers top, down, left and right in 180° view angle, which is contrary to traditional screen that lacks even flatness and causes phantom effect; the screen has good light absorbance and causes no reflection so its easy on the eyes.

For rear projection, the screen can be used with lights on. For front projection, a black cloth with surface concavity and convexity can be put on the screen back to stabilize light absorbance and saturate colors.

Unlike traditional screen when moved may generate static charges that attract dust and require regular cleaning, the present screen is semiconductor antistatic treated, so it does not attract dusts and keeps clean for both sides permanently.

The screen is water cleanable and viewable in rain. Contrarily, the traditional screen leaves handprints or smudge marks after hand touch and affects picture quality.

The screen has excellent color saturation and is suitable for all 480P, 720P, and 1080P projectors to deliver high quality pictures.

In summary, the present improved projector screen structure is proved to be able to deliver the above benefits and overcome many drawbacks with traditional screens. It meets the requirements for patent with its innovative design and improvement over traditional screen structure. Accordingly, the patent application is submitted.

What is claimed is:

1. An improved screen structure consists of:
    single yarns, 1.28 denier/ply, at least 1,300,000 counts;
    superfine nickel (Ni) chromium (Cr) alloy fiber, with diameter between 0.025 and 0.08 mm; constituted by high-density woven yarns, with even and small spacing, and both sides usable.

2. As described in claim 1 for an improved projector screen structure, said high-density yarn has ends per inch between 22,000 and 30,000 counts (1.28 D)/inch, and picks per inch between 14,000 and 20,000 counts (1.28 D)/inch.

3. As described in claim 1 for an improved projector screen structure, said superfine nickel (Ni) chromium (Cr) alloy fiber is characterized by having a diameter of 0.038 mm.

* * * * *